(12) United States Patent
Choi et al.

(10) Patent No.: US 11,201,694 B2
(45) Date of Patent: Dec. 14, 2021

(54) METHOD AND APPARATUS FOR OPTIMIZING AVERAGE BIT ERROR PROBABILITY VIA DEEP MULTI-ARMED BANDIT IN OFDM AND INDEX MODULATION SYSTEM FOR LOW POWER COMMUNICATION

(71) Applicant: KOREA ADVANCED INSTITUTE OF SCIENCE AND TECHNOLOGY, Daejeon (KR)

(72) Inventors: Wan Choi, Daejeon (KR); Jinkyu Lee, Daejeon (KR); Junil Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/878,826

(22) Filed: May 20, 2020

(65) Prior Publication Data

US 2021/0160007 A1    May 27, 2021

(30) Foreign Application Priority Data

Nov. 26, 2019    (KR) .................. 10-2019-0153297

(51) Int. Cl.
*H04L 1/00*    (2006.01)
*H04L 27/26*    (2006.01)
*H04L 27/18*    (2006.01)

(52) U.S. Cl.
CPC ............ *H04L 1/0054* (2013.01); *H04L 27/18* (2013.01); *H04L 27/2601* (2013.01); *H04L 27/2626* (2013.01)

(58) Field of Classification Search
CPC .............. H04L 1/0054; H04L 27/2601; H04L 27/2626; H04L 27/2627; H04L 27/18; H04L 27/20
See application file for complete search history.

(56) References Cited

U.S. PATENT DOCUMENTS 9,960,831 B2 *   5/2018  Basar .................. H04L 27/2697
10,148,325 B2 *  12/2018 Wu ...................... H04B 7/0639

OTHER PUBLICATIONS

S. A. Nambi and K. Giridhar, "Lower Order Modulation Aided BER Reduction in OFDM With Index Modulation," in IEEE Communications Letters, vol. 22, No. 8, pp. 1596-1599, Aug. 2018, doi: 10.1109/LCOMM.2018.2844355. (Year: 2018).*

(Continued)

*Primary Examiner* — Betsy Deppe
(74) *Attorney, Agent, or Firm* — Hoffmann Warnick LLC

(57) ABSTRACT

A method and apparatus for optimizing average bit error probability via a deep multi-armed bandit in an orthogonal-frequency division multiplexing and index modulation system for low power communication are proposed. The method proposed in the present invention comprises: detecting BPSK symbols and subcarriers among all subcarriers; defining a combination of selected subcarriers as a subcarrier selection pattern; selecting the subcarrier selection pattern through learning to minimize the average bit error probability for all combinations of selected subcarriers; and updating a learning parameter of the subcarrier selection pattern selected through learning.

19 Claims, 4 Drawing Sheets

(56) References Cited

OTHER PUBLICATIONS

L. Girish and A. Thakre, "Filtered OFDM with Index Modulation," 2018 International Conference on Advances in Computing, Communications and Informatics (ICACCI), Bangalore, India, 2018, pp. 1631-1635, doi: 10.1109/ICACCI.2018.8554687. (Year: 2018).*
E. Basar, "Index modulation techniques for 5G wireless networks," in IEEE Communications Magazine, vol. 54, No. 7, pp. 168-175, Jul. 2016, doi: 10.1109/MCOM.2016.7509396. (Year: 2016).*
E. Başar, Ü. Aygölü, E. Panayirci and H. V. Poor, "Orthogonal frequency division multiplexing with index modulation," 2012 IEEE Global Communications Conference (GLOBECOM), 2012, pp. 4741-4746, doi: 10.1109/GLOCOM.2012.6503868.*
E. Basar, M. Wen, R. Mesleh, M. Di Renzo, Y. Xiao and H. Haas, "Index Modulation Techniques for Next-Generation Wireless Networks," in IEEE Access, vol. 5, pp. 16693-16746, 2017, doi: 10.1109/ACCESS.2017.2737528.*
Nghia H. et al., "Fast-OFDM With Index Modulation for NB-IoT", IEEE Communications Letters, vol. 23, No. 7, Jul. 2019, 4 pages.
Salma Kazemi Rashed et al., "Spectrum Decision in Cognitive Radio Networks using Multi-Armed Bandit", 2015 5th International Conference on Computer and Knowledge Engineering (ICCKE), 4 pages.

* cited by examiner

METHOD AND APPARATUS FOR OPTIMIZING AVERAGE BIT ERROR PROBABILITY VIA DEEP MULTI-ARMED BANDIT IN OFDM AND INDEX MODULATION SYSTEM FOR LOW POWER COMMUNICATION

CROSS REFERENCE TO RELATED APPLICATION

This application is based on and claims priority under 35 U.S.C. 119 to Korean Patent Application No. 10-2019-0153297, filed on 26 Nov. 2019, in the Korean Intellectual Property Office, the disclosures of which is herein incorporated by reference in their entireties.

BACKGROUND OF THE INVENTION

Field of the Invention

The present invention relates to a method and apparatus for optimizing average bit error probability via a deep multi-armed bandit in an orthogonal-frequency division multiplexing and index modulation (OFDM-IM) system for low power communication.

Related Art

With the increase in mobile traffic, multicarrier transmission has attracted considerable attention from academia and industry alike. Orthogonal frequency-division multiplexing (OFDM) has become one of the most leading technologies in 4G communication, and is considered as a major candidate for the next-generation communication. Also, OFDM is widely used in many wireless standards to meet the demand for high data transfer rates in communication systems operating in frequency-selective fading channels.

5G networks for a variety of applications such as autonomous vehicle communication and the Internet of things require characteristics like high data rate, high energy efficiency, and low delay rate, due to the explosive increase in mobile traffic and the popularization of smart devices. In line with this trend, a new concept called "index modulation" (IM) is receiving attention as a way to meet the above requirements of wireless communication. Concretely, index modulation is a highly energy-efficient yet simple digital modulation scheme, which uses communication resources with indices such as, antennas, time, and frequency to convey additional information bits. Index modulation can achieve low complexity and high energy efficiency, since only some of the communication resources with indices are used for data transmission and their indices are detected by on/off energy detection alone.

A number of studies have been conducted to select some among all subcarriers available in OFDM systems and use the indices of the selected subcarriers. Generally, maximum likelihood detection is used at the receiver, in order to successfully detect the indices of subcarriers used at the transmitter. However, the complexity of the maximum likelihood detection increases exponentially with the number of subcarriers used in the communication system. Thus, the detection technique cannot be used if the number of subcarriers is large. For example, the number of subcarriers used in an actual LTE system is 512, and the number of combinations created by selecting 256 among the 512 subcarriers is $4.7255*10^{152}$. Hence, in the existing studies, it is assumed that all subcarriers are divided into a number of groups to lower the complexity of the subcarrier selection process. However, this assumption in the existing studies requires that the smaller the number of subcarriers assigned to each group, the more subcarriers that need to be activated, thus reducing energy efficiency. Moreover, since OFDM-IM systems use only some of all available subcarriers, selecting only some subcarriers greatly affects the average bit error probability of the system. In the existing studies, there was proposed a method of individually selecting subcarriers having maximum channel size by using each subcarrier's channel information. However, subcarrier combinations, as well as the channel size of subcarriers, affect average bit error probability since additional information is transmitted through the indices of the subcarrier combinations. Therefore, individually selecting subcarriers based on heuristic criteria without considering the combinatorial effect created by selecting only some subcarriers cannot ensure optimum bit error probability.

SUMMARY OF THE INVENTION

A technical object to be accomplished by the present invention is to provide an OFDM-IM transmitter that selects and uses only some subcarriers, without dividing all subcarriers into a number of groups. The concept of a neural network is introduced to solve problems with memory in the transmitter, occurring in the subcarrier selection process due to a large number of combinations. Moreover, the present invention is aimed at finding a subcarrier set that minimizes average bit error probability, by jointly selecting subcarriers to take every combination into account. The present invention proposes a combinatorial optimization problem for jointly selecting subcarriers. Furthermore, the present invention proposes a deep multi-armed bandit framework to solve the combinatorial optimization problem.

In one aspect, there is provided a method for optimizing average bit error probability via a deep multi-armed bandit in an orthogonal-frequency division multiplexing and index modulation system for low power communication according to an exemplary embodiment of the present invention, the method comprising: detecting binary phase shift keying (BPSK) symbols and subcarriers among all subcarriers; defining a combination of selected subcarriers as a subcarrier selection pattern; selecting the subcarrier selection pattern through learning to minimize the average bit error probability for all combinations of selected subcarriers; and updating a learning parameter of the subcarrier selection pattern selected through learning.

In the defining of a combination of selected subcarriers as a subcarrier selection pattern, the subcarrier selection pattern may be represented as a vector representing BPSK symbols depending on the use or non-use of each subcarrier, wherein maximum likelihood detection may be used to jointly detect BPSK symbols and a subcarrier selection pattern, and, in the maximum likelihood detection, a transmitted signal may be determined based on the Euclidean distance between received signal and transmitted signal.

In the selecting of the subcarrier selection pattern through learning to minimize the average bit error probability for all combinations of selected subcarriers, a multi-armed bandit (MAB) algorithm may be used, and, with the MAB algorithm, a set of $2^{m_1}$ subcarrier selection patterns may be selected to minimize bit error probability, and the bit error probability and reward for the selected set of $2^{m_1}$ subcarrier selection patterns may be obtained.

The set of subcarrier selection patterns may be determined in such a way as to maximize reward for the transmission of each OFDM-IM block, and the set $S_i$ of $2^{m_1}$ subcarrier selection patterns may be selected using the upper confidence bound (UCB).

In the selecting of the subcarrier selection pattern through learning to minimize the average bit error probability for all combinations of selected subcarriers, the set having the highest UCB may be selected for transmission among all sets of subcarrier selection patterns, in order to select a set of subcarrier selection patterns through learned UCBs, without an exploitation process for all combinations of subcarrier selection patterns.

The selecting of the subcarrier selection pattern through learning to minimize the average bit error probability for all combinations of selected subcarriers may further comprise an initialization step of setting combinatorial observations and rewards for all sets of subcarrier selection patterns to 0.

In the updating of a learning parameter of the subcarrier selection pattern selected through learning, a deep neural network may be used that learns the channel size of the subcarriers in the set of subcarrier selection patterns as input and the UCB for the set of subcarrier selections as output. The learning parameter may represent the bit error probability of the set of subcarrier selection patterns, and learning may be performed to minimize the average bit error probability for all combinations of subcarriers using a deep neural network, without storing the combinatorial observations of all sets of subcarrier selection patterns in a table.

In another aspect, there is provided an apparatus for optimizing average bit error probability via a deep multi-armed bandit in an orthogonal-frequency division multiplexing and index modulation system for low power communication, the apparatus comprising: a detection part that detects BPSK symbols and subcarriers among all subcarriers; a subcarrier selection pattern determination part that defines a combination of selected subcarriers as a subcarrier selection pattern and selects the subcarrier selection pattern through learning to minimize the average bit error probability for all combinations of selected subcarriers; and a learning part that updates a learning parameter of the subcarrier selection pattern selected through learning.

According to exemplary embodiments of the present invention, the concept of a deep neural network is introduced to overcome limitations of memory required in an index modulation process at a transmitter, due to a large number of subcarrier combinations. Moreover, the existing studies did not reflect the effects caused by combinations of subcarriers, because subcarriers are selected individually, simply by taking channel gain into account. In the present invention, a novel algorithm for minimizing bit error probability, and subcarriers for minimizing bit error probability are selected through the algorithm.

DESCRIPTION OF EXEMPLARY EMBODIMENTS

When one group uses all subcarriers, only a small number of subcarriers are activated to convey the same amount of information. Thus, each subcarrier can be allocated more power, which leads to high energy efficiency. However, this requires a large number of subcarrier combinations, thus increasing the size of memory required for the index modulation process at the transmitter. To overcome this memory limitation, the present invention introduces a deep neural network. Moreover, the conventional art did not reflect the effects caused by the combinations of subcarriers, because subcarriers are selected individually, simply by taking channel gain into account. In the present invention, a novel algorithm for minimizing bit error probability, and subcarriers for minimizing bit error probability are selected through the algorithm. Hereinafter, an exemplary embodiment of the present invention will be described in detail with reference to the accompanying drawings.

Figure 1:
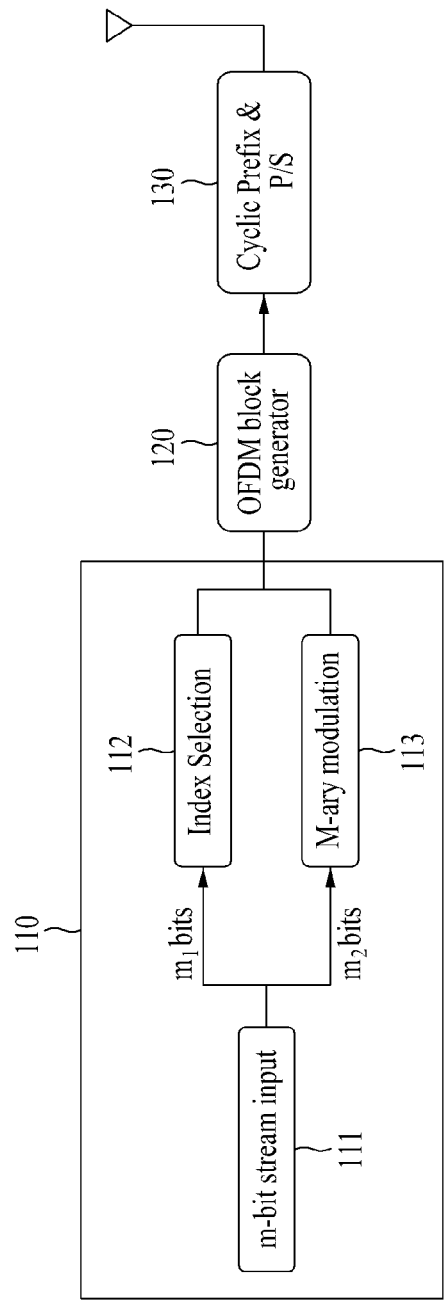
FIG. 1 is a view illustrating a structure of a transmitter according to an exemplary embodiment of the present invention.

FIG. 1 a view illustrating a structure of a transmitter according to an exemplary embodiment of the present invention.

The proposed transmitter comprises an error probability optimization apparatus 110, an OFDM block generator 120, and a cyclic prefix (CP) & P/S 130.

The error probability optimization apparatus 110 according to the exemplary embodiment of the present invention detects BPSK symbols and subcarriers among all subcarriers and defines a combination of selected subcarriers as a subcarrier selection pattern (SSP). Also, the subcarrier selection pattern is selected through learning to minimize the average bit error probability for all combinations of selected subcarriers, and a learning parameter of the subcarrier selection pattern selected through learning is updated. The error probability optimization apparatus 110 may be configured to perform the steps 210 through 240 of FIG. 2. An internal structure of the error probability optimization apparatus 110 will be described in more details with reference to FIG. 5.

The transmitter determines a set of subcarrier selection patterns through the proposed algorithm, and maximizes reward for the transmission of each OFDM-IM block through the OFDM block generator 120.

Afterwards, transmission is done through the block of the CP & P/S 130 in order to prevent inter-channel interference.

In the present invention, an OFDM-IM system is taken into account, where each group uses a total of N subcarriers, without the N subcarriers being divided into a number of groups, as opposed to the conventional art. A total of m-bit stream inputs (e.g., see FIG. 1, "m-bit stream input 111") are transmitted through N subcarriers. Each group in the OFDM-IM system uses K subcarriers out of N subcarriers, in order to transmit m bits. Among the m bits, $m_2$ bits are transmitted through K BPSK symbols (e.g., see FIG. 1, "M-ary modulation 113"), and the remaining bits, i.e., $m_1$ bits, are transmitted through the indices of combinations of K subcarriers (e.g., see FIG. 1, "index selection 112"). A method for optimizing average bit error probability via a deep multi-armed bandit in an orthogonal-frequency division multiplexing and index modulation system for low power communication according to the exemplary embodiment of the present invention will be described in more details with reference to FIG. 2.

Figure 2:
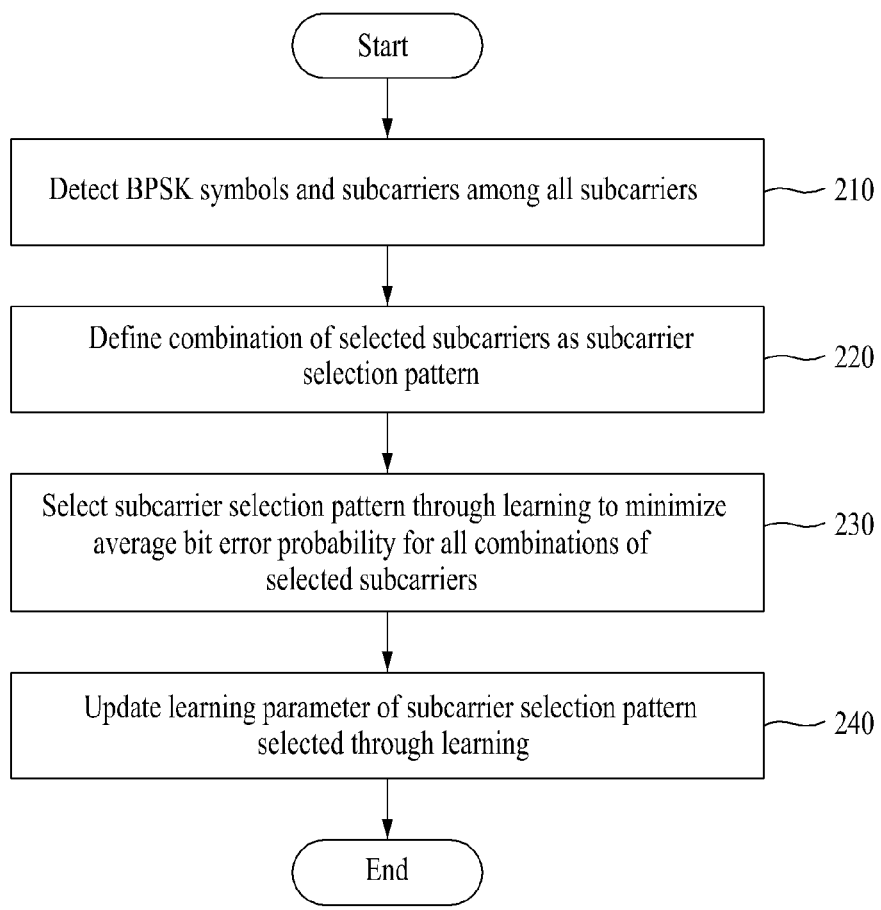
FIG. 2 is a flowchart illustrating a method for optimizing average bit error probability via a deep multi-armed bandit in an orthogonal-frequency division multiplexing and index modulation system for low power communication according to an exemplary embodiment of the present invention.

FIG. 2 is a flowchart illustrating a method for optimizing average bit error probability via a deep multi-armed bandit in an orthogonal-frequency division multiplexing and index modulation system for low power communication according to an exemplary embodiment of the present invention.

The proposed method for optimizing average bit error probability via a deep multi-armed bandit in an orthogonal-frequency division multiplexing and index modulation system for low power communication comprises: the step 210 of detecting BPSK symbols and subcarriers among all subcarriers; the step 220 of defining a combination of selected subcarriers as a subcarrier selection pattern SSP; the step 230 of selecting the subcarrier selection pattern through learning to minimize the average bit error probability for all combinations of selected subcarriers; and the step 240 of updating a learning parameter of the subcarrier selection pattern selected through learning.

In the step 210, BPSK symbols and subcarriers are detected among all subcarriers. In the present invention, an OFDM-IM system is taken into account, where a total of N subcarriers are used in one group, without the N subcarriers being divided into a number of groups, as opposed to the conventional art. A total of m-bit stream inputs are transmitted through N subcarriers. Each group in the OFDM-IM system uses K subcarriers out of N subcarriers, in order to transmit m bits. Among the m bits, $m_2$ bits are transmitted through K BPSK symbols, and the remaining bits, i.e., $m_1$ bits, are transmitted through the indices of combinations of K subcarriers.

In the step 220, a combination of selected subcarriers is defined as a subcarrier selection pattern SSP. The subcarrier selection pattern is represented as a vector representing BPSK symbols depending on the use or non-use of each subcarrier. According to the exemplary embodiment of the present invention, maximum likelihood detection is used to jointly detect BPSK symbols and a subcarrier selection pattern, and, in the maximum likelihood detection, a transmitted signal is determined based on the Euclidean distance between received signal and transmitted signal.

In the present invention, a combination of selected K subcarriers is defined as a subcarrier selection pattern (SSP). The use or non-use of the $j^{th}$ subcarrier of the selected SSP is expressed as:

$$I(j) = \begin{cases} 1 & \text{if } j\text{-}th \text{ subcarrier is activaged} \\ 0 & \text{if } j\text{-}th \text{ subcarrier is not activated} \end{cases}$$

Then, using the above expression, the vector of the SSP may be represented as:

$$I_i = [I(1) \ldots I(N)] \in \{0,1\}^{1 \times N}.$$

Then, the OFDM-IM subcarrier block transmitted by the transmitter is as follows:

$$x_F = [x(1) x(2) \ldots x(N)]$$

where each element of the above vector is a BPSK symbol, which is given by:

$$x(j) = \begin{cases} S, & I(j) = 1 \\ 0, & I(j) = 0 \end{cases}$$

If the $j^{th}$ subcarrier is used, x(j) indicates a BPSK symbol; otherwise, 0.

Figure 3:
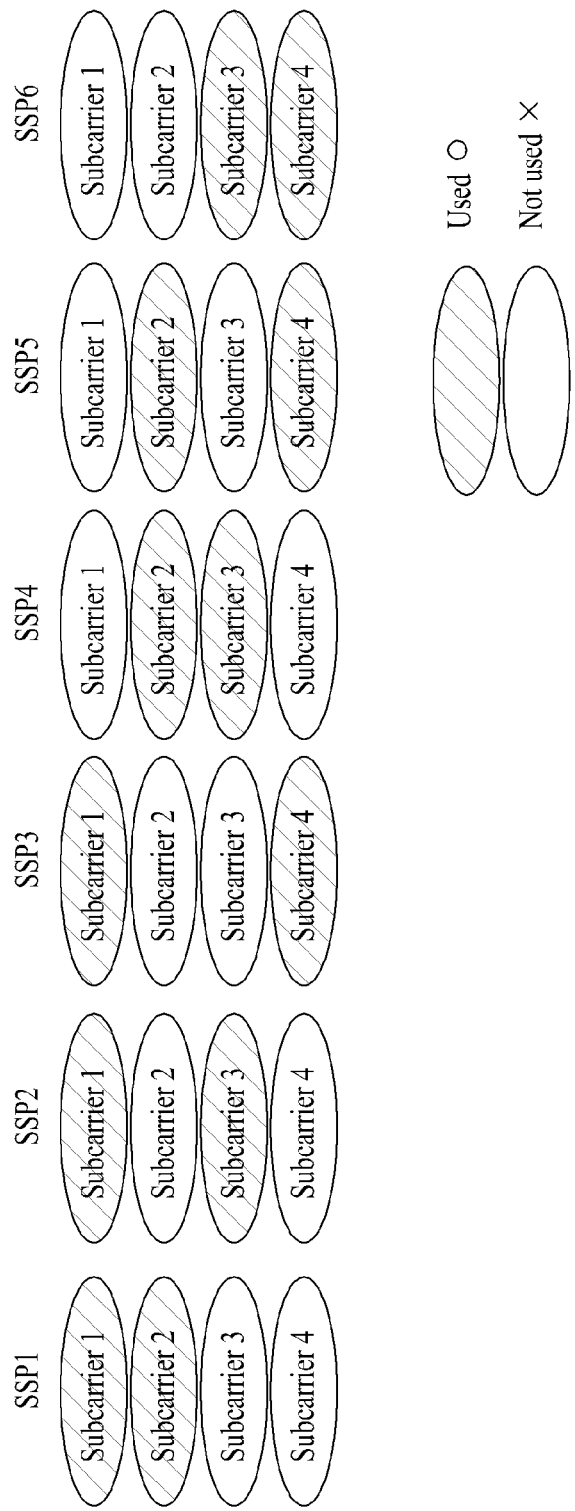
FIG. 3 is a view illustrating a subcarrier selection pattern according to an exemplary embodiment of the present invention.

FIG. 3 is a view illustrating a subcarrier selection pattern according to an exemplary embodiment of the present invention.

Subcarrier selection patterns SSP1, SSP2, . . . , SSP6 may be defined depending on the use or non-use of subcarriers Subcarrier1, Subcarrier2, Subcarrier3, and Subcarrier 4. Referring to FIG. 3, for SSP1, Subcarrier1 and Subcarrier2 are used, and Subcarrier3 and Subcarrier4 are not used. For SSP2, Subcarrier1 and Subcarrier3 are used, and Subcarrier2 and Subcarrier4 are not used. This way, the patterns may be represented depending on the use or non-use of each subcarrier.

A received signal in the frequency domain is as follows:

$$y_F(j) = \sqrt{\frac{P}{K}} x(j) h_F(j) + w_F(j), \quad j = 1, \ldots, N$$

$h_F(j)$ and $w_F(j)$ of the receive signal are channel fading coefficient and noise component, respectively, which follow the complex Gaussian distribution. The receiver has to find out the BPSK symbols and the SSP used by the transmitter from the above received signal $y_F(j)$. Also, in the present invention, the receiver uses maximum likelihood detection to jointly detect the BPSK symbols and the SSP. A maximum likelihood detector determines a transmitted signal based on the Euclidean distance between the received signal and the transmitted signal.

$$\hat{x}_F = \underset{s, I_i \in S_i}{\operatorname{argmin}} \sum_{j=1}^{N} \left| y_F(j) - \sqrt{\frac{P}{KGN_{0,F}}} s(j) h_F(j) \right|^2$$

where $I_i$ and $S_i$ denote SSP and SSP set, respectively. Then, the bit error probability of the transmitted signal determined based on the Euclidean distance may be represented as:

$$P(x_F \to \hat{x}_F | h) = Q\left(\sqrt{\frac{P}{KN_{0,F}} \|(x_F - \hat{x}_F)h\|_F^2}\right)$$

$$= Q\left(\sqrt{\frac{P}{KN_{0,F}} \sum_{j=1}^{N} |h_F(j)|^2 \times |\hat{x}_F(j)|^2}\right)$$

And, the upper limit for the average bit error probability may be represented as follows using the characteristics of Q function:

$$\bar{P}_b \leq \frac{1}{2^{m_1} M^K} \sum_{x_P} \sum_{\hat{x}_F} P(x_F \to \hat{x}_F) \frac{d(x_F, \hat{x}_F)}{m}$$

Referring again to FIG. 2, in the step 230, the subcarrier selection pattern is selected through learning to minimize average bit error probability for all combinations of selected subcarriers.

A multi-armed bandit (MAB) algorithm is used, and, with the MAB algorithm, a set of $2^{m_1}$ subcarrier selection patterns is selected to minimize bit error probability, and the bit error probability and reward for the selected set of $2^{m_1}$ subcarrier selection patterns are obtained. In this case, the set of $2^{m_1}$ subcarrier selection patterns is determined in such a way as to maximize reward for the transmission of each OFDM-IM block.

In the present invention, a combination optimization problem for selecting an SSP set for minimizing average bit error probability is defined as:

$$\underset{S_i}{\text{minimize}} \bar{P}_b \quad (3.1)$$

$$\text{subject to } I_i \in S_i \quad (3.2)$$

$$S_i \subset C \quad (3.3)$$

$$|C| = \binom{P}{2^{m_1}} \quad (3.4)$$

$$i(j) \in \{0, 1\} \quad (3.5)$$

where the formula (3.2) requires that one SSP be selected from a predefined SSP set $S_i$ in order to represent $m_1$. The formula (3.4) denotes the number of all available SSP sets, where $$P = \binom{N}{K}.$$

The formula (3.5) indicates the use or non-use of the $j^{th}$ subcarrier of the SSP, and yields a value of 0 or 1. This means that the above combination optimization problem is an integer programming problem, and therefore the existing convex optimization techniques cannot be used. Moreover, since the formula (3.4) increases exponentially with the number of subcarriers, the size of an optimal solution set also increases exponentially. Given this, it is not efficient to look for all solution sets to find the optimal solution. The present invention proposes a method for efficiently finding an SSP that minimizes average bit error probability.

In the present invention, a multi-armed bandit (MAB) approach is proposed to select an SSP that minimizes average bit error probability. In the proposed algorithm, $2^{m_1}$ SSPs are selected to minimize bit error probability. A combinatorial observation of $S_i$ is defined as:

$$\Omega_{S_i} = \frac{1}{2^{m_1} M^K} \sum_{x_F} \sum_{\hat{x}_F} P(x_F \to \hat{x}_F \mid h) \frac{d(x_F, \hat{x}_F)}{m}$$

The above combinatorial observation is the bit error probability that occurs when the set $S_i$ of $2^{m_1}$ SSPs is selected. Then, the reward for the set $S_i$ may be represented as:

$$R_{S_i} = 1 - \Omega_{S_i}$$

The transmitter determines the SSP set $S_i$ through the proposed algorithm in a way that maximizes reward for the transmission of each OFDM-IM block. The proposed algorithm comprises three steps: an initialization period, a switching period, and a nonswitching period. The first step is an initialization step in which combinatorial observations and rewards for all sets $S_i$ are set to 0. The second step (in other words, the step 230) is a step in which the set $S_i$ of $2^{m_1}$ SSPs is selected using the upper confidence bound (UCB). The UCB is defined as:

$$UCB_{S_i} = \frac{R_{S_i}}{T_{S_i}} + \sqrt{\frac{\beta \log(n)}{T_{S_i}}}$$

Where $T_{S_i}$ is the number of times the set $S_i$ is selected, and $\beta$ is the value for adjusting the convergence rate of the algorithm and the ratio of exploration and exploitation. The ratio of exploration and exploitation of the algorithm increases, because the rate at which the log(n) converges to 0 slows down as $\beta$ increases. The set $S_i$ having the highest UCB is selected for transmission, among a total of $|C|$ sets $S_i$. The UCB also plays the role of pruning. Since the UCB has a low value when $T_{N_i}$ of the UCB is sufficiently high, a set $S_i$ having a high UCB value (a set $S_i$ that is selected a small number of times) is to be selected. As a result, the transmitter is able to select $S_i$ through learned UCBs, without an exploitation process for all combinations. In the third step, a learning parameter of the set $S_i$ selected in the second step is updated.

In other words, in the step 240, a learning parameter of the subcarrier selection pattern selected through learning is updated.

The learning parameter is the combinatorial observation $\Omega_{S_i}$ which is defined above as the bit error probability of the set $S_i$. And, in a period between the second and third steps, the proposed algorithm does not store the $\Omega_{S_i}$ value for every set $S_i$ in a table.

Figure 4:
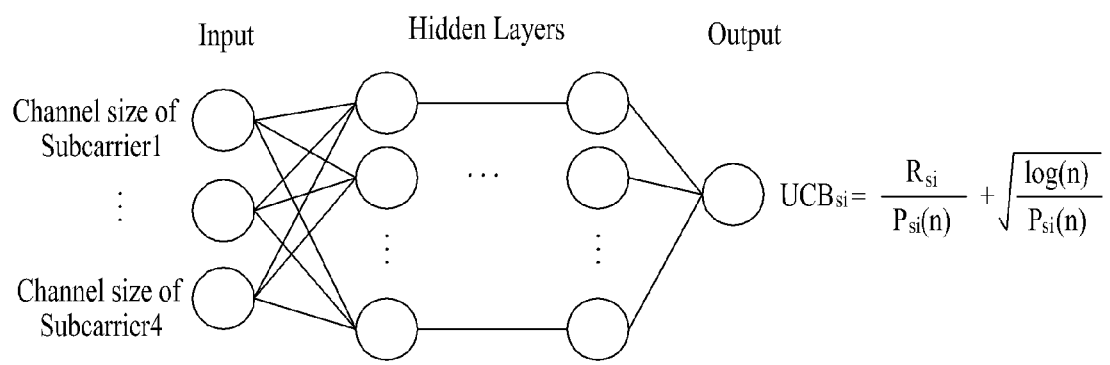
FIG. 4 is a view showing a relationship diagram of input and output in a deep neural network according to an exemplary embodiment of the present invention.

FIG. 4 is a view showing a relationship diagram of input and output in a deep neural network according to an exemplary embodiment of the present invention.

Since the present invention assumes a large number of subcarriers N, the $\Omega_{S_i}$ value, which need to be updated, increases exponentially with N. This requires a table for storing and updating the UCBs for all sets $S_i$ after computing them, and therefore it is impossible to store all of the results in an OFDM-IM system using a large number of subcarriers. Accordingly, as shown in FIG. 4, the present invention uses a deep neural network, instead of a table, that learns the channel size of the subcarriers in the set $S_i$ as input and the UCB for the set $S_i$ as output. With the use of the proposed deep neural network, there is no need to store the UCB, which allows for the design of a transmitter that overcomes memory limitations and deals with a large number of subcarriers. Below is a pseudocode of the proposed algorithm.

---

Algorithm 1
Multi-play MAB Algorithm considering the combinatorial reward

---

Require: Cs$_i$, Rs$_i$, Ts$_i$
 / /initialize arms' parameters
 Ωs$_i$ ← 0, i = 1, . . . . , L
 Rs$_i$ ← 0, i = 1, . . . . , L
 Ts$_i$ ← 0, i = 1, . . . . , L
 for i = 1, . . . . , L do
  / /switching period(exploration)

-continued

Algorithm 1
Multi-play MAB Algorithm considering the combinatorial reward $$UCBs_i \leftarrow \frac{Rs_i}{Ts_i} \sqrt{\frac{2\log(n)}{Ts_i}}, \text{ for } i = 1, \ldots, L$$

Figure 5:
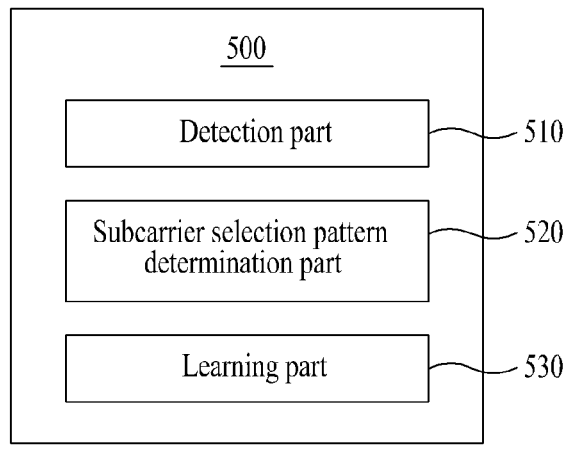
FIG. 5 is a view showing a configuration of an apparatus for optimizing average bit error probability via a deep multi-armed bandit in an orthogonal-frequency division multiplexing and index modulation system for low power communication according to an exemplary embodiment of the present invention.

/ /update neural network parameter for computing UCB
for i = 1, . . . , L do
   $UCBs_i \leftarrow S_i$
end for
/ /subset selection
$S_i \leftarrow \emptyset$
for i = 1, . . . , L do
   $S_i \leftarrow \arg\max UCBs_i$ with probability 1 - $\in$
   $S_i \leftarrow$ a randomly choosen set $S_i$ with probability $\in$
end for
/ / non swithching period(exploitation)
for $\forall I_i \in S_i$ do
   Observe the selected SAPs to get error probability for $\forall I_i \in S_i$
   Update $\Omega s_i$, for $\forall I_i \in S_i$
   $Ts_i \leftarrow Ts_i + 1$, for $\forall I_i \in S_i$
end for
/ /Update the rewards
$Rs_i \leftarrow \Omega s_i$, for $\forall I_i \in S_i$
end for
return $S_i$ FIG. 5 is a view showing a configuration of an apparatus for optimizing average bit error probability via a deep multi-armed bandit (MAB) in an orthogonal-frequency division multiplexing and index modulation system for low power communication according to an exemplary embodiment of the present invention.

The proposed apparatus 500 for optimizing average bit error probability via a deep multi-armed bandit in an orthogonal-frequency division multiplexing and index modulation system for low power communication comprises a detection part 510, a subcarrier selection pattern determination part 520, and a learning part 530.

The detection part 510 detects BPSK symbols and subcarriers among all subcarriers. In the present invention, an OFDM-IM system is taken into account, where a total of N subcarriers are used in one group, without the N subcarriers being divided into a number of groups, as opposed to the conventional art. A total of m-bit stream inputs are transmitted through N subcarriers. Each group in the OFDM-IM system uses K subcarriers out of N subcarriers, in order to transmit m bits. Among the m bits, $m_2$ bits are transmitted through K BPSK symbols, and the remaining bits, i.e., $m_1$ bits, are transmitted through the indices of combinations of K subcarriers.

The subcarrier selection pattern determination part 520 defines a combination of selected subcarriers as a subcarrier selection pattern (SSP). The subcarrier selection pattern is represented as a vector representing BPSK symbols depending on the use or non-use of each subcarrier. According to the exemplary embodiment of the present invention, maximum likelihood detection is used to jointly detect BPSK symbols and a subcarrier selection pattern, and, in the maximum likelihood detection, a transmitted signal is determined based on the Euclidean distance between received signal and transmitted signal.

The subcarrier selection pattern determination part 520 selects the subcarrier selection pattern through learning to minimize the average bit error probability for all combinations of selected subcarriers.

The subcarrier selection pattern determination part 520 uses a multi-armed bandit (MAB) algorithm, and, with the MAB algorithm, selects a set of $2^{m_1}$ subcarrier selection patterns to minimize bit error probability and obtains the bit error probability and reward for the selected set of $2^{m_1}$ subcarrier selection patterns. In this case, the set of subcarrier selection patterns is determined in such a way as to maximize reward for the transmission of each OFDM-IM block. As explained above, the set $S_i$ of $2^{m_1}$ SSPs is selected using the upper confidence bound (UCB).

The subcarrier selection pattern determination part 520 selects the set having the highest UCB for transmission, among a total of |C| sets $S_i$, in order to select a set of subcarrier selection patterns through learned UCBs, without an exploitation process for all combinations of subcarrier selection patterns.

In the initialization step, the subcarrier selection pattern determination part 520 sets combinatorial observations and rewards for all sets of subcarrier selection patterns to 0.

The learning part 530 uses a deep neural network that learns the channel size of the subcarriers in the set of subcarrier selection patterns as input and the UCB for the set $S_i$ as output.

The learning parameter represents the bit error probability of the set of subcarrier selection patterns, and the learning part 530 performs learning to minimize the average bit error probability for all combinations of subcarriers using a deep neural network, without storing the combinatorial observations of all sets of subcarrier selection patterns in a table.

The apparatus described above may be realized by hardware elements, software elements and/or combinations thereof. For example, the devices and components described in the exemplary embodiments may be implemented in one or more general-use computers or special-purpose computers, such as a processor, a controller, an arithmetic logic unit (ALU), a digital signal processor, a microcomputer, a field programmable gate array (FPGA), a programmable logic unit (PLU), a microprocessor or any device which may execute instructions and respond. A processing unit may process an operating system (OS) or one or more software applications running on the OS. Further, the processing unit may access, store, manipulate, process, and generate data in response to software execution. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof, and may configure a processing unit to operate in a desired manner or may independently or collectively control the processing unit. Software and/or data may be permanently or temporarily embodied in any type of machine, components, physical equipment, virtual equipment, or computer storage media or units so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The method according to the above-described exemplary embodiments may be implemented with program instructions which may be executed through various computer means, and may be recorded in computer-readable media. The computer-readable media may also include, alone or in combination, the program instructions, data files, data structures, and the like. The program instructions recorded on the media may be those specially designed and constructed for the purposes of example embodiments, or they may be of the kind well-known and available to those having skill in the computer software arts. Examples of the computer-readable recording media may include magnetic media such as hard disks, floppy disks, and magnetic tapes, optical media such as CD-ROMs and DVDs, magneto-optical media such as floptical disks, and hardware devices specially configured to store and perform program instructions, such as ROM (ROM), random access memory (RAM), and flash memory. Examples of the program instructions may include machine-language code, such as code written by a compiler, and high-level language code executable by a computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implementations, other embodiments, and equivalents to the claims are within the scope of the following claims.

What is claimed is:

1. A method for optimizing average bit error probability via a deep multi-armed bandit in an orthogonal-frequency division multiplexing and index modulation (OFDM-IM) system for low power communication, the method comprising:
    detecting binary phase shift keying (BPSK) symbols and a plurality of subcarriers among all subcarriers;
    defining a plurality of subcarrier selection patterns, each subcarrier selection pattern (SSP) including a combination of individual subcarriers selected from the plurality of subcarriers;
    selecting a set of subcarrier selection patterns from the plurality of subcarrier selection patterns through learning; and
    updating a learning parameter of the set of subcarrier selection patterns selected through learning.

2. The method of claim 1, wherein each subcarrier selection pattern is represented as a vector representing BPSK symbols depending on a use or non-use of each of the individual subcarriers.

3. The method of claim 2, wherein the method further includes using a maximum likelihood detection to jointly detect a subcarrier selection pattern and its respective BPSK symbols in a received signal, and, in the maximum likelihood detection, determining a transmitted signal based on the Euclidean distance between the received signal and the transmitted signal.

4. The method of claim 1, wherein the selecting the set of subcarrier selection patterns through learning further includes using a multi-armed bandit (MAB) algorithm to select the set of subcarrier selection patterns, and obtaining a bit error probability and a reward for the selected set of subcarrier selection patterns.

5. The method of claim 4, wherein the selecting the set of subcarrier selection patterns through learning further includes maximizing the reward for a transmission of each OFDM-IM block of the OFDM-IM system.

6. The method of claim 4, wherein the selecting the set of subcarrier selection patterns from the plurality of subcarrier selection patterns through learning further includes selecting a set $S_i$ of subcarrier selection patterns using an upper confidence bound (UCB), wherein the UCB is defined as:

$$UCB_{S_i} = \frac{R_{S_i}}{T_{S_i}} + \sqrt{\frac{\beta \log(n)}{T_{S_i}}}$$

where $R_{S_i}$ is the reward for the set $S_i$ of subcarrier selection patterns, $T_{S_i}$ is a number of times the set $S_i$ of subcarrier selection patterns is selected, and $\beta$ is a value for adjusting a convergence rate of the MAB algorithm and a ratio of exploration and exploitation.

7. The method of claim 6, wherein the method further includes selecting the set $S_i$ having the highest UCB.

8. The method of claim 6, wherein the updating the learning parameter of the set of subcarrier selection patterns further includes using a deep neural network that learns a channel size of subcarriers in the set of subcarrier selection patterns as an input and the UCB for the set of subcarrier selection patterns as an output.

9. The method of claim 1, wherein the selecting the set of subcarrier selection patterns through learning further includes setting combinatorial observations and rewards for the set of subcarrier selection patterns to 0.

10. The method of claim 1, wherein the learning parameter represents a bit error probability of the set of subcarrier selection patterns, and the method further includes performing learning to minimize the average bit error probability for all combinations of individual subcarriers using a deep neural network without storing combinatorial observations of all sets of subcarrier selection patterns.

11. An apparatus for optimizing average bit error probability via a deep multi-armed bandit in an orthogonal-frequency division multiplexing and index modulation (OFDM-IM) system for low power communication, the apparatus comprising:
    a detection part that detects binary phase shift keying (BPSK) symbols and a plurality of subcarriers among all subcarriers;
    a subcarrier selection pattern determination part that defines a plurality of subcarrier selection patterns, each subcarrier selection pattern including a combination of individual subcarriers selected from the plurality of subcarriers, and selects a set of the subcarrier selection patterns from the plurality of subcarrier selection patterns through learning; and
    a learning part that updates a learning parameter of the set of subcarrier selection patterns selected through learning.

12. The apparatus of claim 11, wherein the subcarrier selection pattern determination part represents each subcarrier selection pattern as a vector representing BPSK symbols depending on a use or non-use of each of the individual subcarriers.

13. The apparatus of claim 11, wherein the subcarrier selection pattern determination part uses a multi-armed bandit (MAB) algorithm, selects the set of subcarrier selection patterns to minimize bit error probability, and obtains a bit error probability and a reward for the selected set of subcarrier selection patterns.

14. The apparatus of claim 13, wherein the set of subcarrier selection patterns is determined in such a way as to maximize the reward for a transmission of each OFDM-IM block of the OFDM-IM system.

15. The apparatus of claim 13, wherein a set $S_i$ is selected from the plurality of subcarrier selection patterns using an upper confidence bound (UCB), wherein the UCB is defined as:

$$UCB_{S_i} = \frac{R_{S_i}}{T_{S_i}} + \sqrt{\frac{\beta \log(n)}{T_{S_i}}}$$

Where $R_{S_i}$ is the reward for the set $S_i$ of subcarrier selection patterns, $T_{S_i}$ is a number of times the set $S_i$ of subcarrier selection patterns is selected, and β is a value for adjusting a convergence rate of the MAB algorithm and a ratio of exploration and exploitation.

16. The apparatus of claim 15, wherein the subcarrier selection pattern determination part selects the set $S_i$ having the highest UCB.

17. The apparatus of claim 15, wherein the learning part uses a deep neural network that learns a channel size of subcarriers in the set of subcarrier selection patterns as an input and the UCB for the set of subcarrier selections as an output.

18. The apparatus of claim 11, wherein the subcarrier selection pattern determination part sets combinatorial observations and rewards for the set of subcarrier selection patterns to 0.

19. The apparatus of claim 11, wherein the learning parameter represents a bit error probability of the set of subcarrier selection patterns, and the learning part performs learning to minimize the average bit error probability for all combinations of individual subcarriers using a deep neural network without storing the combinatorial observations of all sets of subcarrier selection patterns.

* * * * *